(12) United States Patent
Knauft et al.

(10) Patent No.: US 10,810,143 B2
(45) Date of Patent: Oct. 20, 2020

(54) DISTRIBUTED STORAGE SYSTEM AND METHOD FOR MANAGING STORAGE ACCESS BANDWIDTH FOR MULTIPLE CLIENTS

(71) Applicant: VMware, Inc., Palo Alto, CA (US)

(72) Inventors: Eric Knauft, San Francisco, CA (US);
Enning Xiang, San Jose, CA (US);
Yiqi Xu, Redwood City, CA (US);
Xiaochuan Shen, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 95 days.

(21) Appl. No.: 15/944,743

(22) Filed: Apr. 3, 2018

(65) Prior Publication Data
US 2019/0303308 A1    Oct. 3, 2019

(51) Int. Cl.
| | |
|---|---|
| *G06F 13/16* | (2006.01) |
| *H04L 12/873* | (2013.01) |
| *H04L 29/08* | (2006.01) |
| *G06F 9/455* | (2018.01) |
| *H04L 12/875* | (2013.01) |

(52) U.S. Cl.
CPC ...... *G06F 13/1642* (2013.01); *G06F 9/45558* (2013.01); *G06F 13/1689* (2013.01); *H04L 47/527* (2013.01); *H04L 47/56* (2013.01); *H04L 67/1097* (2013.01); *G06F 2009/45579* (2013.01)

(58) Field of Classification Search
CPC .......... G06F 9/46; G06F 9/5016; H04L 47/29
See application file for complete search history.

(56) References Cited

U.S. PATENT DOCUMENTS

| | | | |
|---|---|---|---|
| 8,108,872 B1* | 1/2012 | Lindholm | G06F 9/5016 718/104 |
| 9,160,673 B1* | 10/2015 | Lang | H04L 47/29 |
| 2003/0189930 A1* | 10/2003 | Terrell | H04L 45/00 370/389 |
| 2005/0015385 A1* | 1/2005 | Chinner | G06F 16/10 |
| 2012/0127862 A1* | 5/2012 | Madsen | H04L 47/10 370/235 |
| 2013/0088968 A1* | 4/2013 | Kim | H04L 47/11 370/235 |
| 2013/0125127 A1* | 5/2013 | Mital | G06F 9/46 718/102 |

* cited by examiner

*Primary Examiner* — Getente A Yimer
(74) *Attorney, Agent, or Firm* — Loza & Loza, LLP

(57) ABSTRACT

System and method for managing storage requests issued from multiple sources in a distributed storage system utilizes different queues at a host computer in the distributed storage system to place different classes of storage requests for access to a virtual storage area network. The storage requests in the queues are processed using a fair scheduling algorithm. For each queue, when the storage requests in the queue exceeds a threshold, a backpressure signal is generated and transmitted to at least one source for a class of storage requests queued in one of the queues corresponding to that backpressure signal to delay issuance of new storage requests of that class of storage requests.

17 Claims, 6 Drawing Sheets

DISTRIBUTED STORAGE SYSTEM AND METHOD FOR MANAGING STORAGE ACCESS BANDWIDTH FOR MULTIPLE CLIENTS

BACKGROUND

A distributed storage system allows a cluster of host computers to aggregate local storage devices, which may be located in or attached to each host computer, to create a single and shared pool of storage. This pool of storage is accessible by all host computers in the cluster, including any virtualized instances running on the host computers, such as virtual machines. Because the shared local storage devices that make up the pool of storage may have different performance characteristics, such as capacity, input/output per second (IOPS) capabilities, etc.), usage of such shared local storage devices to store data may be distributed among the virtual machines based on the needs of each given virtual machine.

This approach provides enterprises with cost-effective performance. For instance, distributed storage using pooled local storage devices is inexpensive, highly scalable, and relatively simple to manage. Because such distributed storage can use commodity storage devices, e.g., disk drives, in the cluster, enterprises do not need to invest in additional storage infrastructure. However, one issue that arises with this approach relates to contention between multiple clients, such as virtual machines on different host computers, accessing the shared storage resources. In particular, reduced overall performance and higher latency occur when multiple clients and/or other software processes need to simultaneously access the same local storage devices.

BRIEF DESCRIPTION OF THE DRAWINGS

Throughout the description, similar reference numbers may be used to identify similar elements.

DETAILED DESCRIPTION

Figure 1:
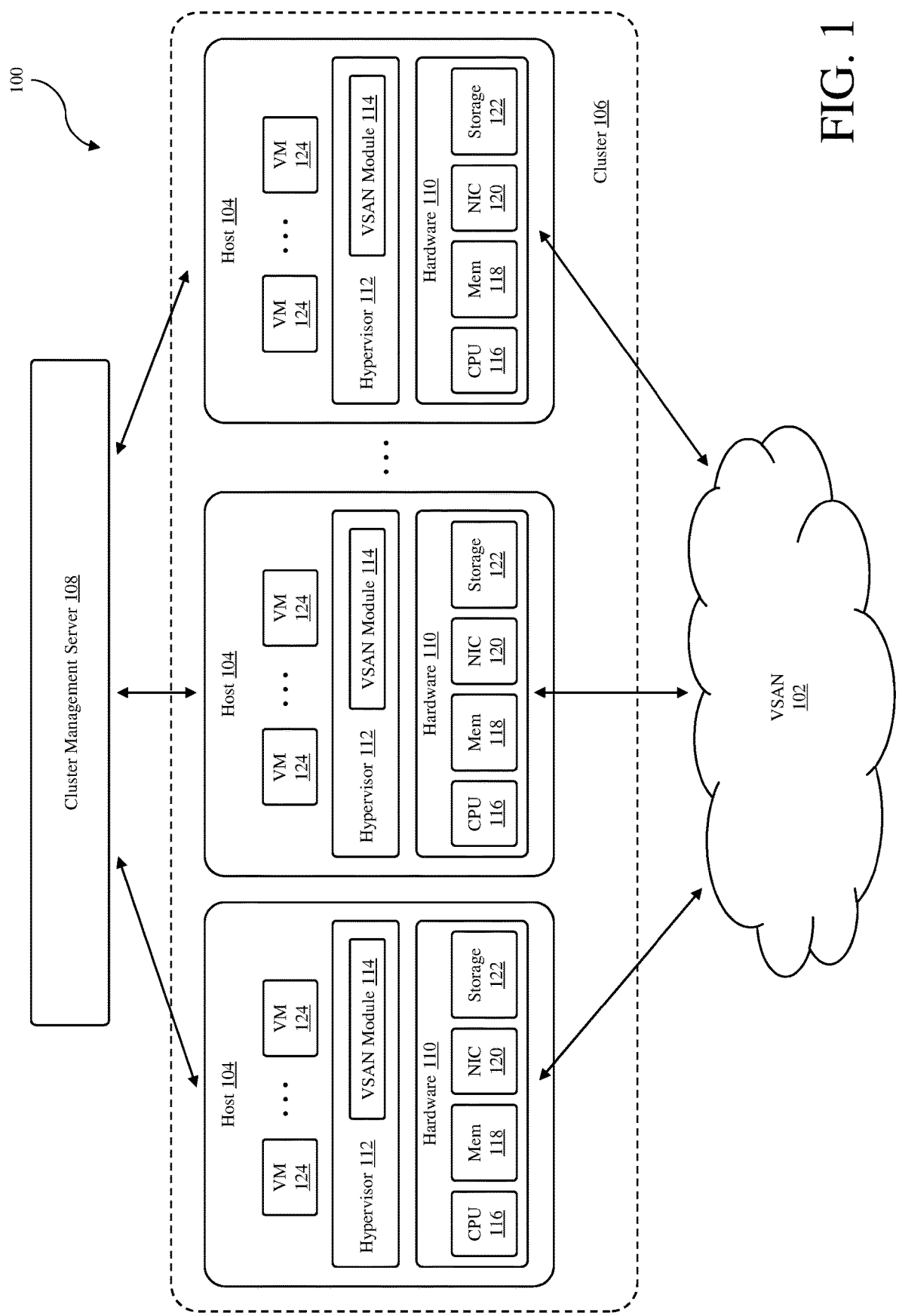
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources.

The cluster management server 108 operates to manage and monitor the cluster 106 of host computers. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU loads on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter.

Each local storage device 122 is a nonvolatile storage, which may be, for example, a solid-state drive (SSD) or a magnetic disk.

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM IOs, the VSAN module may handle other types of storage IOs, such as namespace IOs, resync IOs, and internal metadata I/O. Namespace IOs are writes and read operations for configuration files for VMs, such as vmx files, log files, digest files and memory snapshots. Resync IOs are writes and read operations for data related to failed disks, host computers, racks or clusters. Internal metadata IOs are writes and read operations that are performed on internal data structures other than actual data, such as operations to read from logs, bitmaps, or policies.

In some VSAN systems, storage I/O operations may use a first tier (or "tier-1") device, e.g., a flash drive, of a computer that can service writes quickly, but a later slower destaging process that drains the writes to capacity tier devices, e.g., hard disk drives, of the computer. In such VSAN systems, if the incoming I/O rate is higher than the drain rate, the tier-1 device can fill up. To avoid falling off a cliff from a performance perspective, a congestion mechanism can be used that causes clients, e.g., VMs, to throttle back on how fast I/Os are issued from the clients. The lower layer uses a signal that indicates the fullness of the tier-1 device resources, which is translated into a delay for each incoming I/O at the very top of the stack (possibly on a client running on a different host computer). As the congestion rises, the client would slow down more and more until an equilibrium is reached where the incoming bandwidth equals the destaging bandwidth. This congestion model works well in order to put back pressure on the upper layers of the stack over the inter-node (i.e., inter-host computer) link and adaptively discover the sustainable bandwidth of the destaging process while still absorbing shorter bursts of I/Os at full tier-1 performance.

However, such congestion mechanism does not work well to ensure fairness between different classes of storage I/Os. That is, the processing bandwidth of one type of storage I/Os is affected by the amount of other types of storage I/Os being processed by the VSAN. That is, there may be contentions between the different types of storage I/Os being handled by the VSAN module. Below is an example of such contention between VM I/Os and resync I/Os.

For certain computing environments, it is important to be able to replace a failed host computer and complete a full resync of the host computer data within a reasonable amount of time. Typically, several hours to 1-2 days is acceptable for the full resync. However, in one conventional VSAN system, resync would take 9-12 days to complete in some cases. The reason is because there is no fair allocation of resources between VM I/Os and resync I/Os. In particular, the balance of bandwidth provided for each of the two types of I/Os is dependent on the workload, specifically the number of outstanding IOs (OIOs). In such a VSAN system, doubling the OIOs for an I/O class would double the share of bandwidth it gets (since congestion translates into latency, not bandwidth limits). It was found that VM workload constantly had lots of OIOs, so resync IOs were penalized. It was also found that, when the majority of the resync tasks has completed, there were a handful of tasks each with just one OIO, and the resync throughput was only 1-2% of the whole disk group throughput. Hence, the resync operation required significant amount of time to fully complete.

These results are due to the following two phenomena. First, I/O congestion translates directly into per-I/O latency. This latency depends on the smoothed average history (e.g., exponential moving average), and is scaled based on I/O size. However, it is still enforced for each I/O individually. Thus, issuing more OIO will still give the same latency, and hence, higher bandwidth.

Second, the balance of congestion for different I/O classes (and hence latency) is an emergent property of the system workload and hardware, not something prescriptive or deterministic. Using a conventional congestion mechanism, as a resource like write buffer fills up, congestion is raised linearly starting at a low watermark up to a high watermark. If there is only one source of congestion, adaptive feedback works well, where as the resource fills up and congestion is raised, incoming IOs are slowed down, and eventually an equilibrium point is reached, where the incoming rate from the clients equals the drain rate of the resource (e.g., destaging rate from write buffer to capacity tier).

Figure 2:
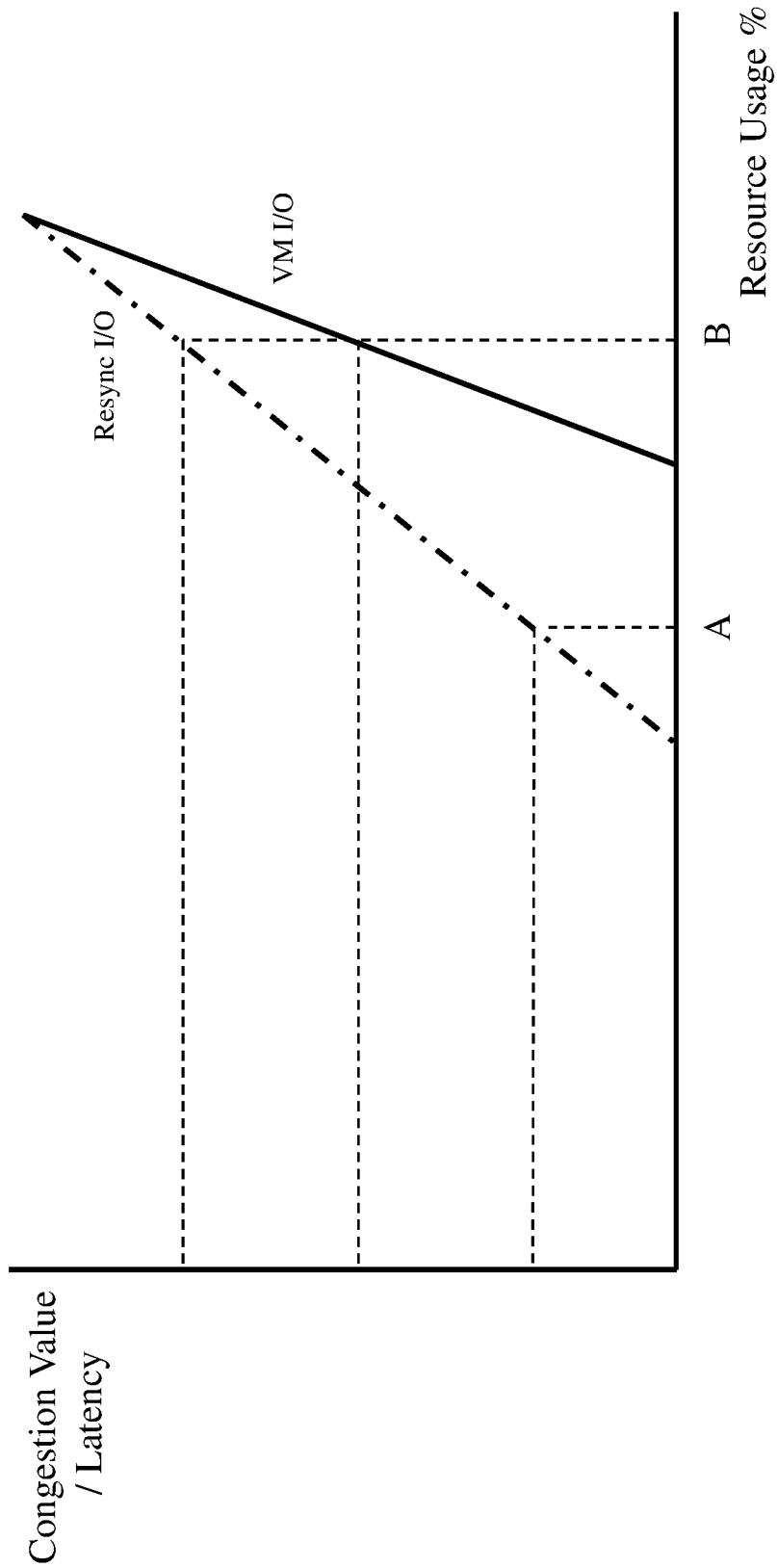
FIG. 2 is a graph of congestion value/latency over percentage of resource usage.

With two classes with different congestion curves, the ratio of the congestion between the two classes depends on how hard the lower layer has to push back against the incoming I/O stream to reach equilibrium. This is illustrated in FIG. 2, which is a graph of congestion value/latency over percentage of resource usage. As shown in the graph as point A, if there is less aggressive resync workload (low-OIO) and no VM workload (zero VM I/O), it may be the case that congestion only needs to be raised a little to get the incoming rate to match the drain rate. At this point, the write buffer fill is still low enough to not have any VM I/O traffic. However, if an aggressive VM workload is started suddenly, the resync I/Os will get an unfairly low share of the bandwidth due to its higher congestion.

In another extreme, let's say that there is a very aggressive resync workload (high OIO that requires high latency/congestion to counteract) as shown in the graph as point B. In this case, high congestion and high write buffer fill may be needed before equilibrium can be reached. At this point, even if some small amount of VM workload is started, the VM workload will be processed slowly since the congestion value is already high. Even though the congestion value for VM I/Os is lower than for resync I/Os, it may not be low enough to allow for good performance.

Figure 3:
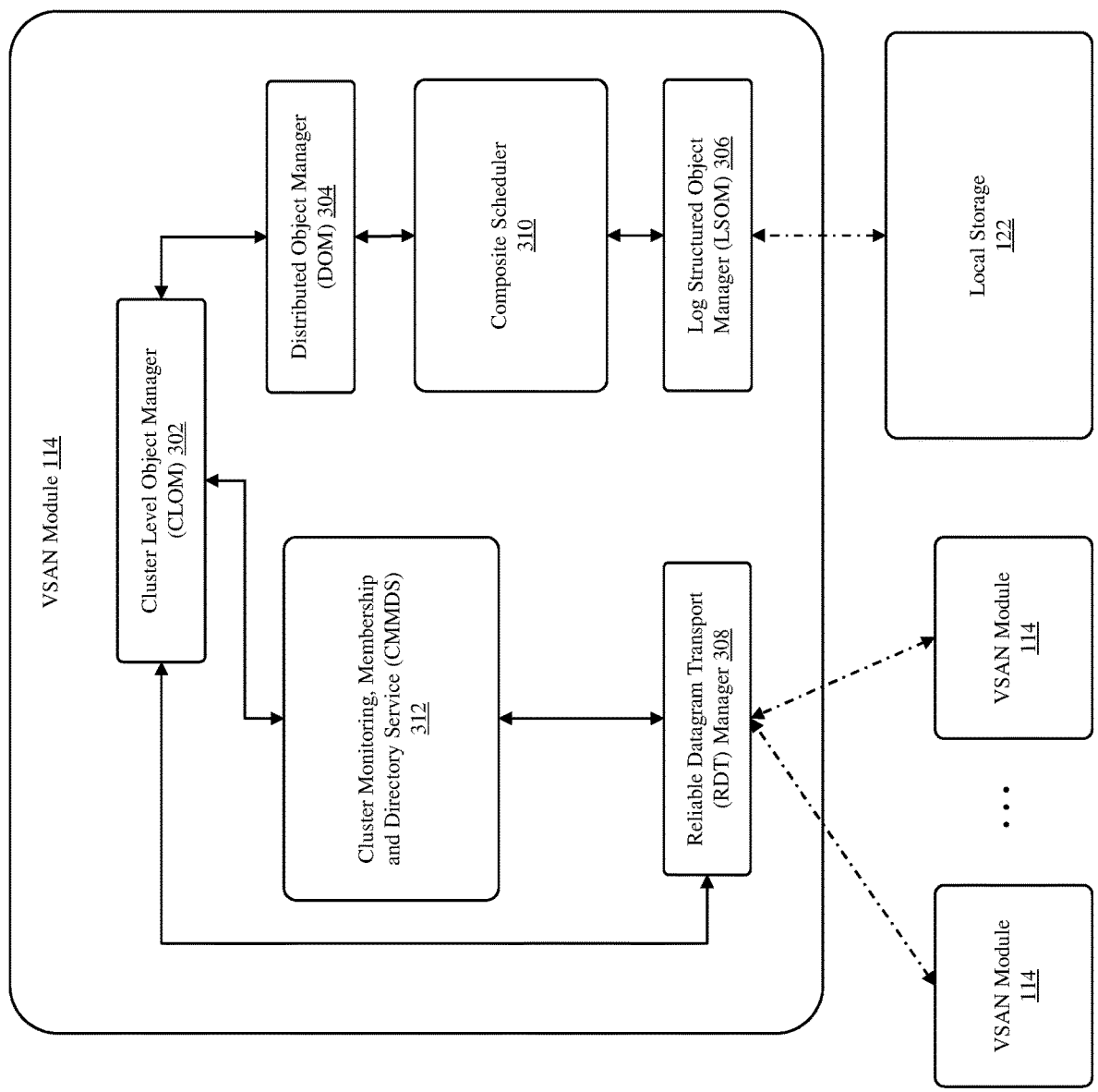
FIG. 3 is a block diagram of a virtual storage array network (VSAN) module in each host computer of the distributed storage system in accordance with an embodiment of the invention.

Turning now to FIG. 3, components of the VSAN module 114, which is included in each host computer 104 in the cluster 106, in accordance with an embodiment of the invention are shown. As shown in FIG. 3, the VSAN module includes a cluster level object manager (CLOM) 302, a distributed object manager (DOM) 304, a local log structured object management (LSOM) 306, a reliable datagram transport (RDT) manager 308, a composite scheduler 310 and a cluster monitoring, membership and directory service (CMMDS) 312. These components of the VSAN module may be implemented as software running on each of the host computers in the cluster.

The CLOM 302 operates to validate storage resource availability, and DOM 304 operates to create components and apply configuration locally through the LSOM 306. The DOM also operates to coordinate with counterparts for component creation on other host computers 104 in the cluster 106. All subsequent reads and writes to storage objects funnel through the DOM 304, which will take them to the appropriate components. The LSOM operates to monitor the flow of storage I/O operations to the local storage 122, for example, to report whether a storage resource is congested. In an embodiment, the LSOM generates a congestion signal that indicates current storage usage, such as the current tier-1 device resource fullness. The RDT manager 308 is the communication mechanism for storage I/Os in a VSAN network, and thus, can communicate with the VSAN modules in other host computers in the cluster. The RDT manager uses transmission control protocol (TCP) at the transport layer and it is responsible for creating and destroying TCP connections (sockets) on demand. The composite scheduler 310 operates to provide backpressure signals to the host computers in the cluster based on the congestion signal and received storage I/O requests and selectively schedules the received storage I/O requests for processing to ensure fairness between different classes of storage I/O requests with respect to management of the storage I/O requests, as described in detail below. The CMMDS 312 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

Figure 4:
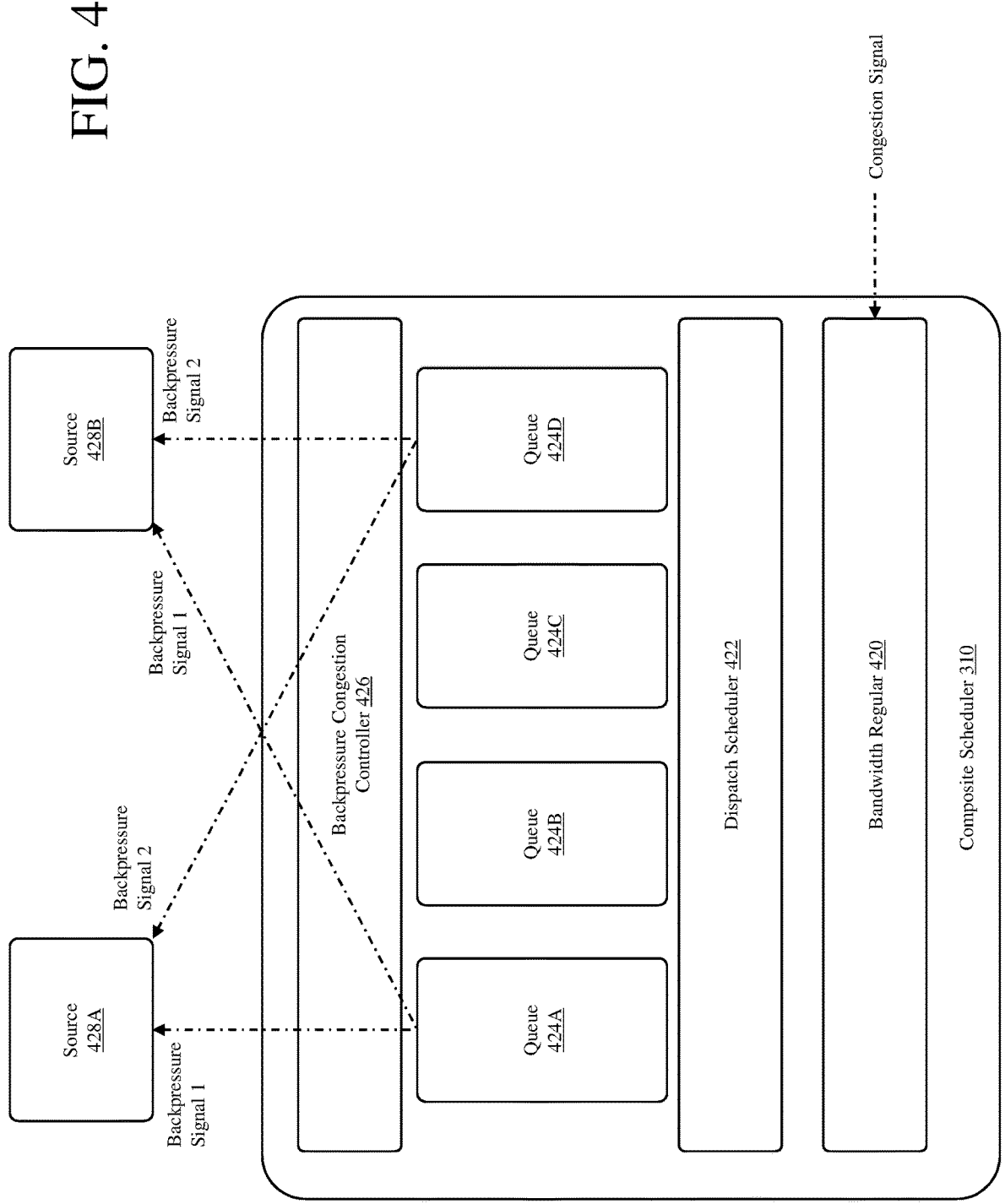
FIG. 4 is a block diagram of a scheduler of the VSAN module shown in FIG. 3 in accordance with an embodiment of the invention.

As noted above, the composite scheduler 310 of the VSAN module 114 manages different classes of storage I/O requests being handled by that VSAN module so that the storage I/O requests processed in a fair manner. FIG. 4, depicts components of the composite scheduler 310 in accordance with an embodiment of the invention. As shown in FIG. 4, the composite scheduler 310 includes a bandwidth regulator 420, a dispatch scheduler 422, four queues 424A, 424B, 424C and 424D for queuing different classes of storage I/O requests, and a backpressure congestion controller 426. In the illustrated embodiment, the queues 424A, 424B, 424C and 424D are used for VM I/O requests, resync I/O requests, namespace I/O requests and internal metadata I/O requests, respectively.

The bandwidth regulator 420 operates to adaptively discover the bandwidth of the local storage devices of the host computer using a congestion signal from the LSOM 306, which is based on the fullness of the local storage devices. In an embodiment, the congestion signal may indicate a congestion indication value, e.g., between 0 and 255, where 0 represents no congestion and 255 represents maximum congestion. The bandwidth regulator interprets the congestion signal from the LSOM as the bandwidth of the local storage devices. In an embodiment, the bandwidth regulator translates the congestion signal to the current bandwidth of the local storage devices using a plot or lookup table to find bandwidths that correspond to specific congestion signals. Such a plot or lookup table may be derived empirically or by other means. In an embodiment, the plot or lookup table can be flexible such that it is learned using online algorithms to target a specific congestion value when equilibrium is reached (when the destaging rate is found). Thus, the plot or lookup table may be defined according to congestion (fullness) policy, rather than only empirically. Depending on the current congestion signal and the bandwidth limit, the bandwidth regulator informs the dispatch scheduler 422 that the dispatch scheduler can issue the next storage I/O request.

The dispatch scheduler 422 operates to maintain the queues 424A, 424B, 424C and 424D for the different classes of I/O requests. Every time the dispatch scheduler is signaled by the bandwidth regulator 420 that the dispatch scheduler can dispatch the next I/O request, the dispatch scheduler will determine which I/O request should be pulled from the queues to ensure fairness. The dispatch scheduler may use any fair scheduling algorithm to dispatch I/O requests from the queues 424A, 424B, 424C and 424D in a fair manner. A fair scheduling algorithm is commonly used by a network scheduler to decide which network packets to forward next from multiple queues. In an embodiment, the dispatch scheduler uses Deficit Round Robin as its fair scheduling algorithm to determine from which queue the next I/O should be pulled. However, in other embodiments, the dispatch scheduler may use other scheduling algorithms, such as SFQ(D) disk scheduling, to determine from which queue the next I/O request should be pulled. Thus, the dispatch scheduler is able to fairly process the different classes of storage I/O requests queued in the different queues.

In an embodiment, the dispatch scheduler 422 also places the incoming storage I/O requests into the appropriate queues 424A, 424B, 424C and 424D based on the I/O request class of each of the received storage I/O requests. Each storage I/O request includes an identifier, which indicates the particular I/O class for the request. This identifier may be included in a header of each storage I/O request. Using the identifier in each storage I/O request, the dispatch scheduler differentiate the different classes of storage I/O requests that are received at the VSAN module 114. In other embodiments, these operations of differentiating the different classes of received storage I/O requests and placing the storage I/O requests into the queues 424A, 424B, 424C and 424D according to their I/O classes may be executed by the DOM 304 of the VSAN module 114.

The backpressure congestion controller 426 operates to generate an independent backpressure signal for each of the queues 424A, 424B, 424C and 424D being maintained by the dispatch scheduler 422 as needed. Depending on the amount of different storage I/O requests coming to the VSAN module 114 to be processed, the queues may fill up at different rates. For each queue, the backpressure congestion controller generates a backpressure signal when the storage I/O requests in that queue reaches a certain threshold. Thus, each backpressure signal for a particular queue is independent of backpressure signals for the other queues. In an embodiment, each of the queues has a predefined minimum and maximum threshold number of elements. In this embodiment, the backpressure congestion controller generates a backpressure signal for each queue when the minimum threshold number has been reached in that queue. Each backpressure signal may include the class of storage I/I/O requests, a backpressure value, and identification of the host computer. The class of storage I/O requests identifies which class of storage I/O requests is associated with the backpressure signal. The backpressure value indicates the fullness or the number of storage I/O requests currently stored in the queue corresponding to the indicated class of storage I/O requests. The backpressure value may be linearly increased as the number of storage I/O requests in the respective queue increases from the minimum threshold number up to the maximum threshold number. The backpressure value corresponding to the maximum threshold number for a queue may indicate a maximum delay or a complete stop in issuing I/O requests of the indicated class to the VSAN module 114. As an example, the backpressure value may be a value from 0 to 255, where 0 corresponds to the minimum threshold number for the respective queue and 255 corresponds to the maximum threshold number for the queue. The identification of the host computer provides an identifier of the host computer from which the backpressure signal originated.

The backpressure congestion controller 426 transmits the backpressure signals to the respective clients or sources, e.g., sources 428A and 428B, that had issued the corresponding storage I/O requests, which were placed in the different queues 424A, 424B, 424C and 424D. The sources of storage I/O requests include the host computers 104 of the cluster 106, the VMs 124 running on the host computers 104 and software processes or routines (not shown) operating in the host computers 104. Thus, for the queue 424A holding VM I/O requests, the backpressure signal will be sent to the VMs that are issuing the VM I/O requests. This is illustrated in FIG. 4, which shows backpressure signal 1 being transmitted to the sources 428A and 428B for the queue 424A. For the queue 424B holding resync I/O requests, the backpressure signal will be sent to the owner of the resync process, which may be one of the host computers in the cluster. For the queue 424C holding namespace I/O requests, the backpressure signal will be sent to the entities making the requests regarding namespace tasks. For the queue 424D holding internal metadata I/O requests, the backpressure signal will be sent to the entities making the requests regarding internal metadata. This is also illustrated in FIG. 4, which shows backpressure signal 2 being transmitted to the sources 428A and 428B for the queue 424D. Each host computer that receives a backpressure signal will implement a delay based on the received congestion signal, which may be a time-averaged latency-based delay. Since each backpressure signal is based on the current fullness of the corresponding queue for particular class of storage I/O requests, the backpressure signals provide independent backpressure congestion controls for the different classes of storage I/O requests. Thus, if one class of storage I/O requests is overwhelming the VSAN module 114, that particular class of storage I/O requests will get backpressure. However, other less backlogged classes of storage I/O requests will still be able to fill up their corresponding queues and get access to the dispatch scheduler 422 without being bottlenecked.

A storage request management operation executed at each host computer 104 of the cluster 106 in the distributed storage system 100 in accordance with an embodiment of the invention is described with reference to a flow diagram of FIG. 5. The storage request management operation involves three processes 500A, 500B and 500C. In the first process 500A, storage I/O requests from sources in the cluster 106, which may include the host computers in the cluster and the VMs 124 running on the host computers 104 in the cluster, are received at a host computer and placed in the queues 424A, 424B, 424C and 424D of the VSAN module 114 of the host computer based on their storage I/O request classes. In the second process, the storage I/O requests in the different queues of the VSAN module of the host computer are processed based on a fair scheduling algorithm and current bandwidth in the local storage resources of the host computer. In the third process, an independent congestion signal for each of the queues is generated from the VSAN module when needed, and transmitted to the relevant sources of storage I/O requests of the class corresponding to that queue so that an appropriate delay can be applied to reduce congestion for that class of storage I/O requests.

Figure 5:
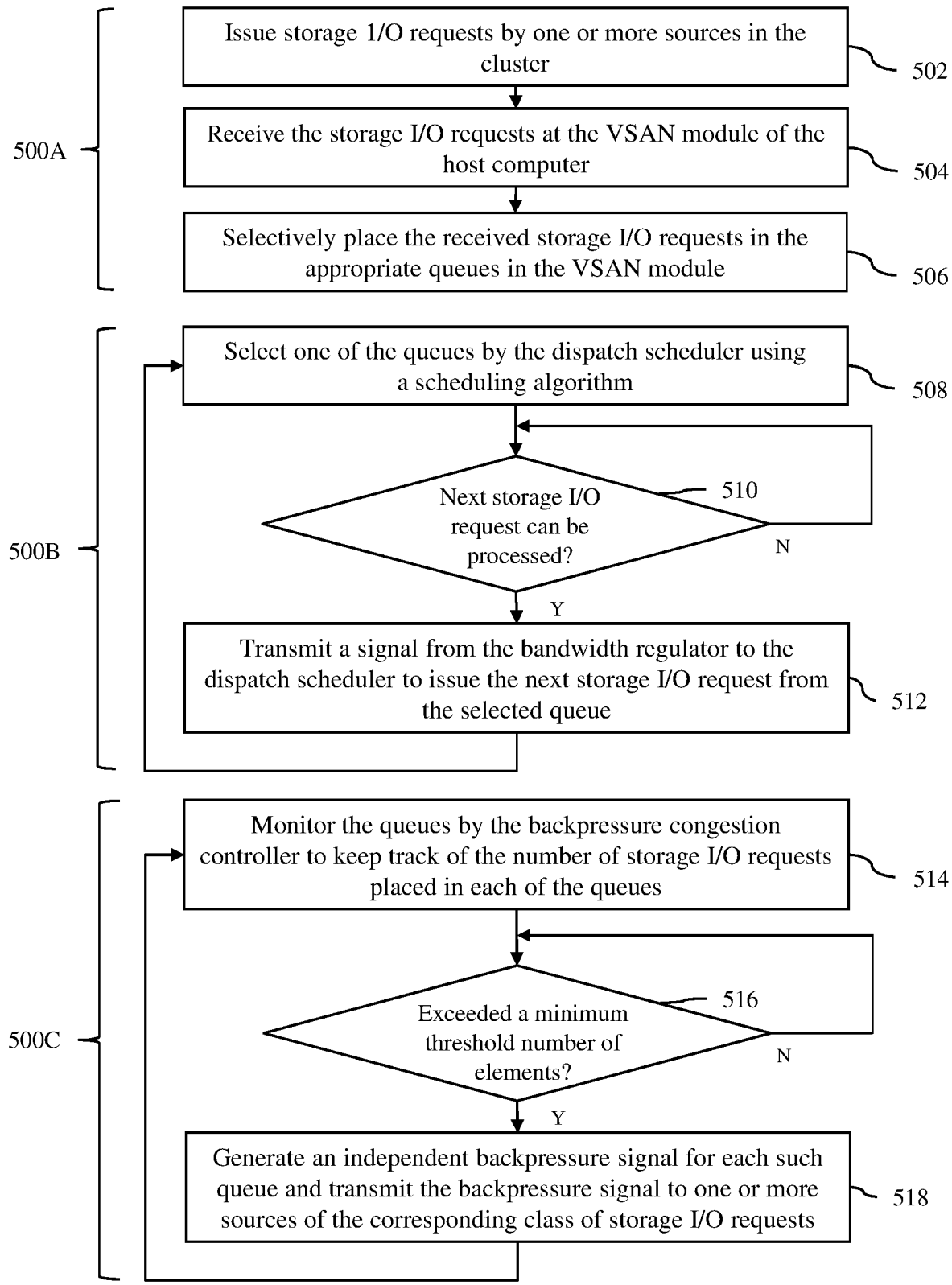
FIG. 5 is a process flow diagram of a storage request management operation executed in each host computer of the cluster in the distributed data storage system in accordance with an embodiment of the invention.

As illustrated in FIG. 5, the first process 500A of the storage request management operation includes blocks 502-506. At block 502, storage I/O requests are issued by one or more sources in the cluster, e.g., host computers 104 in the cluster 106 and/or VMs 124 running on those host computers. In an embodiment, the storage I/O requests may include VM I/O requests, resync I/O requests, namespace I/O requests and internal metadata I/O requests. However, in other embodiments, the storage I/O requests may include other classes of I/O requests.

Next, at block 504, the storage I/O requests are received at the VSAN module 114 of the host computer 104 via the NIC 120 of the host computer. The transmission of the storage I/O requests to the host computer from other host computers in the cluster 106 is facilitated by the RDT managers 308 of the host computers that are involved in the transmission.

Next, at block 506, the received storage I/O requests are selectively placed in the appropriate queues 424A, 424B, 424C and 424D of the composite scheduler 310 in the VSAN module 114. In an embodiment, the different classes of the received storage I/O requests may be identified by the DOM 304 and placed in the queues based on the identified class for each of the storage I/O requests.

As illustrated in FIG. 5, the second process 500B of the storage request management operation includes blocks 508-512. At block 508, one of the queues 424A, 424B, 424C and 424D is selected by the dispatch scheduler 422 using a scheduling algorithm to process one of the storage I/O requests in that queue. In an embodiment, the scheduling algorithm used by the dispatch scheduler is Deficit Round Robin. Next, at block 510, a determination is made by the bandwidth regulator 420 with consideration to an outstanding I/O limit and an outstanding bytes limit whether the next storage I/O request can be processed by the local storage resources of the host computer. This determination may be based on the current congestion signal from the LSOM 306 and the bandwidth limit. If not, then the operation repeatedly loops back to block 510 after a predefined period for each cycle until the next storage I/O request can be processed. However, if it is determined that the next storage I/O request can be processed at block 510, then the operation proceeds to block 512, where a signal is transmitted from the bandwidth regulator to the dispatch scheduler to issue the next storage I/O request from the selected queue. The operation then proceeds back to block 508.

The third process 500C of the storage request management operation includes blocks 514-518. At block 514, the queues 424A, 424B, 424C and 424D are monitored by the backpressure congestion controller to keep track of the number of storage I/O requests placed in each of the queues. At block 516, a determination is made by the backpressure congestion controller whether the storage I/O requests in any of the queues has reached or exceeded a minimum threshold number of elements for the respective queues.

If the storage I/O requests in any of the queues 424A, 424B, 424C and 424D has not reached or exceeded a minimum threshold number of elements for the respective queues, the operation proceeds back to block 516 after a predefined period to again check the current status of the queues with respect to the current number of storage I/O requests in the queues.

If the storage I/O requests in any of the queues 424A, 424B, 424C and 424D has reached or exceeded a minimum threshold number of elements for the respective queues, then the operation proceeds to block 518, where an independent backpressure signal is generated for each such queue by the backpressure congestion controller 426 and the independent backpressure signal is transmitted to one or more sources of the storage I/O requests corresponding to the class of storage I/O requests being handled by that queue. Each independent backpressure signal can then be used by each source, which may be a host computer or a VM in the cluster 106, to delay issuing the class of I/O requests identified in the independent backpressure signal. The amount of delay applied may depend on the backpressure value in the received independent backpressure signal. More delay can be applied as the backpressure value in the received independent backpressure signal indicates a higher level of fullness for the corresponding queue. The operation then proceeds back to block 514 to again monitor the current status of the queues with respect to the current number of storage I/O requests in the queues.

In the embodiment illustrated in FIG. 4, it is assumed that the composite module 310 manages read and write requests for the different classes of storage I/Os requests in the same manner. In other embodiments, the LSOM 306 may be configured to generate a congestion signal for write operations at the local storage resources and another congestion signal for read operations at the local storage resources. In these embodiments, the composite module may include two bandwidth regulators and two dispatch schedulers to handle read and write requests of the different classes of storage IOs requests.

Figure 6:
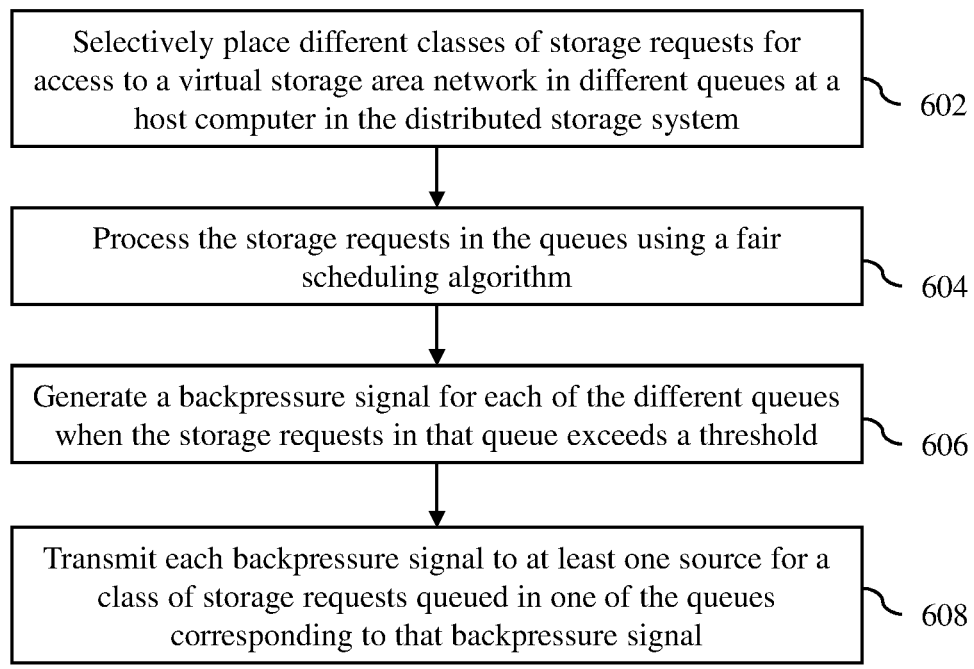
FIG. 6 is a flow diagram of a method of managing storage requests in a distributed storage system in accordance with an embodiment of the invention.

A method for managing storage I/O requests in a distributed storage system in accordance with an embodiment of the invention is described with reference to a flow diagram of FIG. 6. At block 602, different classes of storage requests for access to a virtual storage area network are selectively placed in different queues at a host computer in the distributed storage system so that each class of storage requests is placed in the same queue. At block 604, the storage requests in the queues are processed using a fair scheduling algorithm. At block 606, an independent backpressure signal for each of the different queues is generated when the storage requests in that queue exceeds a threshold. At block 608, each independent backpressure signal is transmitted to at least one source for a class of storage requests queued in one of the queues corresponding to that independent backpressure signal. Each independent backpressure signal is used by the source to delay issuing new storage requests of the class corresponding to the independent backpressure signal.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing storage requests issued from multiple sources in a distributed storage system, the method comprising:
    selectively placing different classes of storage requests for access to a virtual storage area network in different queues at a host computer in the distributed storage system so that each class of storage requests is placed in the same queue, wherein the different classes of storage requests include virtual machine input/output requests, resync input/output requests, namespace input/output requests or internal metadata input/output requests;
    processing the storage requests in the queues using a fair scheduling algorithm;
    generating a backpressure signal for each of the queues when the storage requests in that queue exceeds a threshold; and
    transmitting each backpressure signal to at least one source for a class of storage requests queued in one of the queues corresponding to that backpressure signal, each backpressure signal being used by the at least one source to delay issuing new storage requests of the class corresponding to the backpressure signal.

2. The method of claim 1, wherein processing the storage requests in the queues includes selecting the storage requests in the queues for processing using Deficit Round Robin algorithm.

3. The method of claim 1, further comprising receiving a congestion signal that indicates fullness of at least one local storage device of the host computer.

4. The method of claim 3, further comprising translating the congestion signal to current bandwidth of local storage resources of the host computer to allow storage requests in the queues to be processed.

5. The method of claim 1, wherein the at least one source includes at least one of a virtual machine and another host computer.

6. The method of claim 1, wherein transmitting each backpressure signal includes transmitting a particular backpressure signal to multiple sources of the storage requests for a particular class of storage requests.

7. The method of claim 1, wherein each backpressure signal includes a backpressure value that indicates current fullness of one of the queues.

8. A non-transitory computer-readable storage medium containing program instructions for managing storage requests issued from multiple sources in a distributed storage system, wherein execution of the program instructions by one or more processors of a computer system causes the one or more processors to perform steps comprising:
    selectively placing different classes of storage requests for access to a virtual storage area network in different queues at a host computer in the distributed storage system so that each class of storage requests is placed in the same queue, wherein the different classes of storage requests include virtual machine input/output requests, resync input/output requests, namespace input/output requests or internal metadata input/output requests;
    processing the storage requests in the queues using a fair scheduling algorithm;
    generating a backpressure signal for each of the queues when the storage request in that queue a threshold; and
    transmitting each backpressure signal to at least one source for a class of storage requests queued in one of the queues corresponding to that backpressure signal, each backpressure signal being used by the at least one source to delay issuing new storage requests of the class corresponding to the backpressure signal.

9. The computer-readable storage medium of claim 8, wherein processing the storage requests in the queues includes selecting the storage requests in the queues for processing using Deficit Round Robin algorithm.

10. The computer-readable storage medium of claim 8, wherein the steps further comprise receiving a congestion signal that indicates fullness of at least one local storage device of the host computer.

11. The computer-readable storage medium of claim 10, wherein the steps further comprise translating the congestion signal to current bandwidth of local storage resources of the host computer to allow storage requests in the queues to be processed.

12. The computer-readable storage medium of claim 8, wherein the at least one source includes at least one of a virtual machine and another host computer.

13. The computer-readable storage medium of claim 8, wherein transmitting each backpressure signal includes transmitting a particular backpressure signal to multiple sources of the storage requests for a particular class of storage requests.

14. The computer-readable storage medium of claim 8, wherein each backpressure signal includes a backpressure value that indicates current fullness of one of the queues.

15. A computer system comprising:
    memory; and
    a processor configured to: selectively place different classes of storage requests issued from multiple sources for access to a virtual storage area network in different queues in the computer system so that each class of storage requests is placed in the same queue, wherein the different classes of storage requests include virtual machine input/output requests, resync input/output requests, namespace input/output requests or internal metadata input/output requests;
    process the storage requests in the queues using a fair scheduling algorithm;
    generate a backpressure signal for each of the queues when the storage request in that queue a threshold; and
    transmit each backpressure signal to at least one source for a class of storage requests queued in one of the queues corresponding to that backpressure signal, each backpressure signal being used by the at least one source to delay issuing new storage requests of the class corresponding to the backpressure signal.

16. The computer system of claim 15, wherein the processor is further configured to receive a congestion signal that indicates fullness of at least one local storage device of the computer system and to translate the congestion signal to current bandwidth of local storage resources of the computer system to allow storage requests in the queues to be processed.

17. The computer system of claim 15, wherein each backpressure signal includes a backpressure value that indicates current fullness of one of the queues.

* * * * *